May 21, 1929.  S. I. FEKETE ET AL  1,713,597
TAPPET ADJUSTING SCREW
Filed Jan. 19, 1925
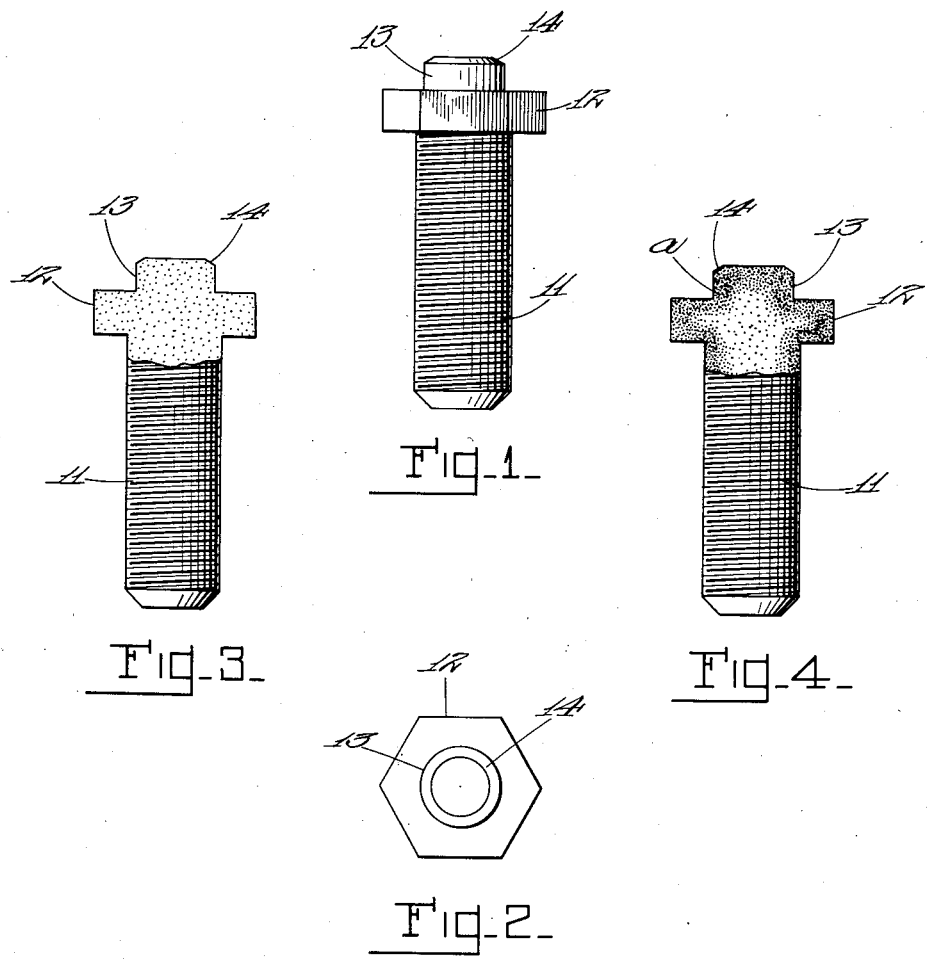
INVENTORS:
Stephen Ivan Fekete and
Homer Murray Northrup
by Macleod, Calver, Copeland & Dike
Attys.

Patented May 21, 1929.

1,713,597

UNITED STATES PATENT OFFICE.

STEPHEN IVAN FEKETE, OF DETROIT, AND HOMER MURRAY NORTHRUP, OF GROSSE POINTE PARK, MICHIGAN, ASSIGNORS TO HUDSON MOTOR CAR COMPANY, OF DETROIT, MICHIGAN, A CORPORATION OF MICHIGAN.

TAPPET-ADJUSTING SCREW.

Application filed January 19, 1925. Serial No. 3,321.

The present invention relates to adjusting screws for valve tappets of internal combustion engines especially for automobiles. The particular object of the invention is to produce at economical price a valve tappet adjusting screw which will withstand long continued severe use.

As is well-known to those skilled in the art, great difficulty has been experienced in the past in constructing a valve tappet adjusting screw which will continue to function properly for long periods of severe use. It has been found in practice that the part of the surface of the head which contacts with the end of the valve stem becomes worn or depressed, thus increasing the valve stem clearance, rendering the engine noisy and interfering with the accurate operation of the valves. Rapid wear of the valve tappet adjusting screws has been a chief cause of increase in noise in engines as they grow older. Various attempts have been made to overcome this difficulty, for instance, by case hardening the head of the screw, but experience proves that the shell of hardened metal is not strong enough to withstand the long continued hammering to which it is subjected and the head is depressed or broken through. Another method has been to provide the head of the screw with an inlay of hardened tool steel or with an inlay of some highly densified fibrous material, but these constructions are expensive and have overcome the difficulties only partly, furthermore the inlays are likely to become loose in time.

The valve tappet adjusting screw embodying our present invention can be made as cheaply as an ordinary case hardened screw and proves more satisfactory in use than any screw which is known to us.

The invention will be fully understood from the following description when taken in connection with the accompanying drawings, and the novel features thereof will be pointed out and clearly defined in the claims at the close of this specification.

In the drawings:

Fig. 1 is a side elevation of a valve tappet adjusting screw embodying our invention.

Fig. 2 is a top plan view of the screw shown in Fig. 1.

Fig. 3 is a side view partly in section showing the screw before it has been carbonized.

Fig. 4 is a similar view indicating the change in the structure of the metal as a result of the manufacturing process by means of which the screw is produced.

Referring to the drawings:

At 11 is shown a screw threaded body and at 12 a non-circular wrench engaging portion, this being preferably hexagonal. Above this is a cylindrical post or column 13 which is preferably circular in cross-section and concentric with the axis of the screw. This may be slightly chamfered, as shown at 14. In making the screw, we employ a good grade of carbon steel, for instance, with .15% to .25% carbon. The screws are preferably formed to final shape on automatic screw machines from bar stock and are then carbonized to introduce carbon in the entire outer surface as shown at $a$ in Fig. 4. Thereafter the screws are allowed to cool and then the head only of the screw is hardened. This is done by heating the screw to a proper temperature and then quenching the head by immersion to the proper depth in some suitable quenching material, as for instance, cold water. Since the post or column 13 is of small diameter and its mass is less than that of the head portion, the post cools more rapidly, therefore becomes harder than the remainder of the head which cools more slowly. We find in practice that the top surface of the post will have about five degrees greater hardness as measured by a scleroscope than it would have if it were the full size of the hexagon diameter or were allowed to taper to it. The hardness is greater than has hitherto been obtainable and greatly increases the life of the screw, and consequently helps to keep the engine quiet for a longer time.

Another important feature of this tappet screw is the fact that the post is practically all high carbon steel due to the fact that it is more completely penetrated by the carbon and therefore forms a hard column which cannot break down or give way under the repeated blows to which it is subjected as do ordinary screws which have only a layer of high carbon steel across the face of the head, this layer being underlaid by soft low carbon steel.

Practical experience with adjusting screws embodying the present invention extending over several months and including observation of screws installed in a large number of engines shows that these screws are much more durable than screws as ordinarily constructed and that the engines containing them require less frequent adjustment of the valves and keep quieter over long periods of time than do engines with tappet adjusting screws heretofore commonly employed.

What we claim is:

1. The method of treating a valve tappet adjusting screw of steel susceptible to being carbonized, and formed with a tool receiving head having thereon an integral projection of smaller diameter, which consists in carbonizing the entire screw, and then quenching the head and projection simultaneously.

2. The method of treating a valve tappet adjusting screw of steel susceptible to being carbonized, and formed with a tool receiving head having thereon an integral projection of smaller diameter, which consists in carbonizing the entire screw, heating the head and projection and then quenching the head and projection only, the same being quenched simultaneously.

3. The method of treating a valve tappet adjusting screw formed of steel susceptible to being carbonized, and formed with a tool receiving head having thereon an integral projection of smaller mass throughout than the head, with the head forming a shoulder surrounding the base of the projection, which consists in carbonizing the entire screw, heating the head and projection and then quenching the head and projection simultaneously.

4. A valve tappet adjusting screw of steel susceptible to being carbonized, having a head, and an integral post on said head of smaller diameter than the head, said post having increased hardness produced by carbonizing and subsequent quench hardening.

5. A valve tappet adjusting screw of steel, susceptible to being carbonized, having a head, and an integral post on said head of smaller diameter than the head, the head forming a shoulder surrounding the base of the post, said post having increased hardness produced by carbonizing and subsequent heating and quench hardening.

In testimony whereof we affix our signatures.

STEPHEN IVAN FEKETE.
HOMER MURRAY NORTHRUP.